US008625440B2

(12) United States Patent
Kahn et al.

(10) Patent No.: US 8,625,440 B2
(45) Date of Patent: Jan. 7, 2014

(54) SYSTEM AND METHOD FOR CONTROLLING PARAMETERS FOR APPLICATIONS SERVICED IN A BEST EFFORT COMMUNICATION LINK

(75) Inventors: Colin L. Kahn, Morris Plains, NJ (US); Tomas S. Young, Parsippany, NJ (US)

(73) Assignee: Alcatel Lucent, Paris (FR)

( * ) Notice: Subject to any disclaimer, the term of this patent is extended or adjusted under 35 U.S.C. 154(b) by 34 days.

(21) Appl. No.: 12/461,094

(22) Filed: Jul. 31, 2009

(65) Prior Publication Data

US 2011/0026412 A1   Feb. 3, 2011

(51) Int. Cl.
*H04W 4/00* (2009.01)
*H04W 28/16* (2009.01)

(52) U.S. Cl.
USPC .......................... 370/252; 370/328; 370/341

(58) Field of Classification Search
None
See application file for complete search history.

(56) References Cited

U.S. PATENT DOCUMENTS

| | | | |
|---|---|---|---|
| 2004/0038685 A1 | 2/2004 | Nakabayashi | |
| 2004/0151114 A1* | 8/2004 | Ruutu | 370/230 |
| 2007/0025359 A1* | 2/2007 | Andriantsiferana et al. | 370/395.21 |
| 2007/0204036 A1* | 8/2007 | Mohaban et al. | 709/224 |
| 2008/0046963 A1* | 2/2008 | Grayson et al. | 726/1 |
| 2008/0275995 A1* | 11/2008 | Soliman et al. | 709/230 |
| 2009/0310540 A1* | 12/2009 | Barany et al. | 370/328 |
| 2010/0054231 A1* | 3/2010 | Dolganow et al. | 370/349 |
| 2010/0192225 A1* | 7/2010 | Ma et al. | 726/23 |
| 2010/0208698 A1* | 8/2010 | Lu et al. | 370/331 |

FOREIGN PATENT DOCUMENTS

| | | |
|---|---|---|
| JP | 2004-112780 | 4/2004 |
| WO | WO 2004/029854 | 4/2004 |
| WO | WO 2007/079773 | 7/2007 |
| WO | WO 2009/089455 | 7/2009 |

OTHER PUBLICATIONS

3rd Generation Partnership Project; Technical Specification Group Services and System Aspects; Policy and Change control architecture (Release 9) 3GPP TS 23.203 v9.0.0 (Mar. 2009).
International Search Report, dated Nov. 10, 2010, issued by the International Searching Authority for International Application No. PCT/US2010/042497.
Notification of Transmittal of the International Search Report and the Written Opinion of the International Searching Authority of the Declaration, dated Nov. 10, 2010, issued by the International Searching Authority, for International Application No. PCT/US2010/042497.
Written Opinion of the International Searching Authority, dated Nov. 10, 2010, issued by the International Searching Authority, for International Application No. PCT/US2010/042497.
Japanese Office action dated May 21, 2013, in corresponding application No. 2012-522892.

* cited by examiner

*Primary Examiner* — Chi Pham
*Assistant Examiner* — Soon-Dong D Hyun
(74) *Attorney, Agent, or Firm* — Harness, Dickey & Pierce

(57) ABSTRACT

The present invention relates to a system and method for controlling parameters for applications serviced in a best effort (BE) communication link. The system includes a protocol specific processor configured to acquire at least one of (i) an application identifier and (ii) type of protocol associated with at least one layer higher than an internet layer for a packet to be transmitted in the BE communication link. The protocol specific processor is also configured to determine parameters for the packet according to the acquired at least one of (i) application identifier and (ii) the type of protocol associated with the at least one layer such that the packet receives quality of service (QoS) treatment in a Radio Access Network.

20 Claims, 4 Drawing Sheets

SYSTEM AND METHOD FOR CONTROLLING PARAMETERS FOR APPLICATIONS SERVICED IN A BEST EFFORT COMMUNICATION LINK

BACKGROUND

All wireless technologies used for mobility have well established mechanisms to provide a quality of service (QoS) differential for data packets sent over an air interface. Types of wireless technologies include Global System for Mobile communications (GSM), Code division multiple access (CDMA), Universal Mobile Telecommunications System (UMTS), Long Term Evolution (LTE), and WiMax, among others, for example.

FIG. 1 illustrates a general architecture of a conventional wireless communication network. In particular, FIG. 1 illustrates a portion of an UMTS wireless network. As shown, a user Equipment (UE) 130 communicates with a Node B 120 over an air interface. Examples of an UE include a mobile station, a mobile unit, a wireless phone, wireless equipped PDA or computer, etc. Multiple Node Bs 120 communicate with a radio network controller (RNC) 110, which provides signaling and traffic processing for each wireless data session. The Node B 120, RNC 110, and the interfaces between these components form what is known as a radio access network (RAN). The RAN communicates with a core network (not shown) to access, for example, the internet. Packet data flowing from the Node B 120 to the RNC 110 is said to flow over the reverse link, and packet data flowing from the RNC 110 to the Node B 120 is said to flow over the forward link. Where used below, Node B 120 may be synonymous with transceiver station (BTS) for CDMA technologies and e-node B for LTE technologies.

The RAN is directed to setup bearers with different QoS criteria according to requests from the UE 130 and directives received from a controlling element 140. For example, in UMTS, the controlling element 140 may be a serving GPRS support node (SGSN) or Gateway GPRS Support Node (GGSN). In CDMA, the controlling element 140 may be Packet Data Serving Node (PNSN), for example. Also, in LTE, the controlling element 140 may be a PDN-GW/SGW. The controlling element 140 directs the RNC 110 and Node B 120 to setup QoS bearers.

After the QoS bearers are established in the RAN, radio link layer aspects of transmission are associated with the established bearers. For example, if a Voice over Internet Protocol (VoIP) is established in the RAN, the RAN responds by associating a specific set of lower protocol layer parameters with the flow associated with the VoIP. The protocol layer parameters with the VoIP flow may involve RF power control targets, IP header compression mechanism (if any), maximum allowable delay bounds for packets, throughput requirements, RLP retransmissions, packet loss rate targets that trigger admission control, overload control, power control or other functions, resource hogging prevention, and packet buffer sizes and times to meet delay targets required by the application associated with the protocols, for example. In general, these parameters are implemented separately for the forward and reverse air-interface links.

Applications that have not been specifically identified by the controlling element 140 as requiring QoS treatment are serviced within a best effort (BE) or Default Bearer communication link in the RNC 110, the Node B 120 and in over-the-air transmission to the UE 130. Unlike wireline transmission, which typically only includes parameters such as queue size and priority constraints, a plurality of other parameters such as the above-identified protocol parameters are set in the RAN. Currently, these parameters are set at a fixed value, independent of the protocols and applications being sent in the BE communication link. As a result, RAN resources are wasted and data packet processing is performed at a sub-optimal level when applications inconsistent with the default settings are serviced within the BE communication link.

For example, Skype™ is a VoIP application that is transmitted in the BE communication link in wireless networks. According to the conventional method, the parameters for the transmitted packets are set according to a fixed value independent of the fact that the application is a VoIP application and/or the type of protocol layers. For instance, RLP retransmission would be enabled, header compression would not take place and air interface packet error rate targets would be set much lower than is necessary for a speech related application. As a result, RAN resources are wasted and the user experience is degraded.

SUMMARY

The present invention relates to a system and method for controlling parameters for applications serviced in a best effort (BE) communication link.

The system includes a protocol specific processor configured to acquire at least one of (i) an application identifier and (ii) type of protocol associated with at least one layer higher than an internet layer for a packet to be transmitted in the BE communication link. The protocol specific processor is also configured to determine parameters for the packet according to the acquired at least one of (i) application identifier and (ii) the type of protocol associated with the at least one layer such that the packet receives quality of service (QoS) treatment in a Radio Access Network.

The determined parameters are QoS parameters associated with the acquired at least one of (i) application identifier and (ii) type of protocol associated with the at least one layer. The at least one layer includes an application layer and transport layer. Alternatively, the at least one layer includes all layers higher than the internet layer.

According to an embodiment, the protocol specific processor is configured to examine the packet to determine the at least one of (i) application identifier and (ii) type of protocol associated with the at least one layer. Alternatively, the protocol specific processor determines the at least one of (i) application identifier and (i) type of protocol associated with the at least one layer by receiving the at least one of (i) application identifier and (i) type of protocol associated with the at least one layer from an external source. Also, the protocol specific processor may be configured to determine the parameters for the packet in-real time.

The protocol specific processor is configured to set the determined parameters for forward link communications. The protocol specific processor is configured to feedback the determined parameters to an access terminal for reverse link communications.

The BE communication link is a communication link that services applications that have not been specifically identified as requiring the QoS treatment. The application identifier is an identifier that identifies a type of application that is associated with the data packet.

The method includes acquiring, by a protocol specific processor, at least one of (i) an application identifier and (ii) type of protocol associated with at least one layer higher than an internet layer for a packet to be transmitted in the BE communication link and determining, by the protocol specific processor, parameters for the packet according to the acquired at least one of (i) application identifier and (ii) type of protocol associated with the at least one layer such that the packet receives quality of service (QoS) treatment in a Radio Access Network.

The method may further include examining the packet to determine the at least one of (i) application identifier and (ii) type of protocol associated with the at least one layer. Alternatively, the method may include determining the at least one of (i) application identifier and (ii) type of protocol associated with the at least one layer by receiving the at least one of (i) application identifier and (ii) type of protocol associated with the at least one layer from an external source.

The method may further include setting the determined parameters for forward link communications and feeding back the determined parameters to an access terminal for reverse link communications.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EXAMPLE EMBODIMENTS

Figure 1:
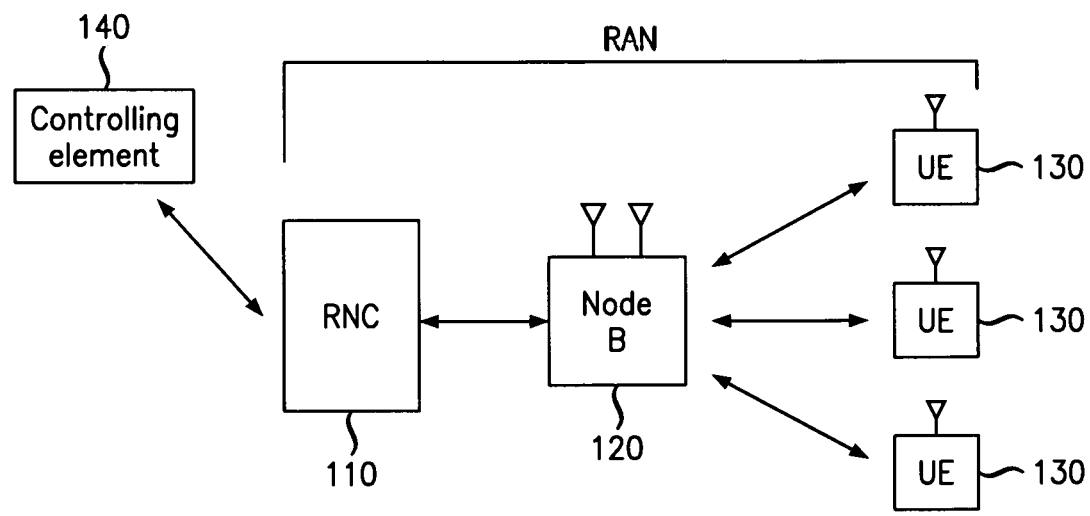
FIG. 1 illustrates a general architecture of a conventional wireless communication network.

Various example embodiments of the present invention will now be described more fully with reference to the accompanying drawings in which some example embodiments of the invention are shown. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "acquiring" or "determining" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 2A:
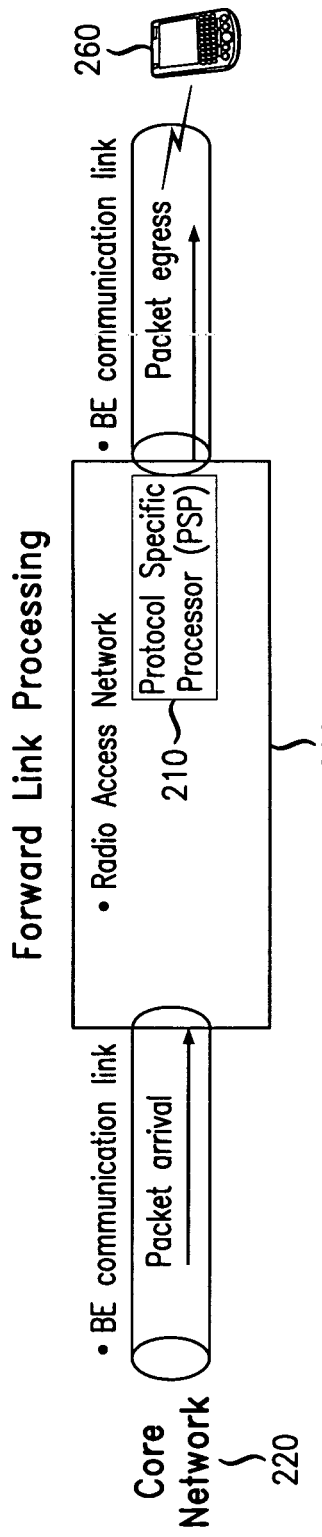
FIG. 2A illustrates a system for controlling parameters for applications serviced in a best effort (BE) communication link on the forward link according to an embodiment of the present invention.

FIG. 2A illustrates a system for controlling parameters for applications serviced in a best effort (BE) communication link on the forward link according to an embodiment of the present invention. For instance, FIG. 2A illustrates a Radio Access Network (RAN) 200, which receives a data packet from a core network 220 in the BE communication link. The RAN 200 includes a protocol specific processor (PSP) 210 for processing data packets received from the core network 220 along the BE communication link. The PSP 210 is any type of processor located within the RAN 200 which processes a specific type of protocol. The data packet may be an IP data packet, for example. An interface is provided between the RAN 200 and the core network 220 for the transfer of data packets in the BE communication link. This interface may contain routers, switches or other network elements needed to transport the packets between the RAN 200 and the core network 220.

The BE communication link is a communication link that services applications that have not been specifically identified by a controlling element 140 of FIG. 1 as requiring QoS treatment. The BE communication link may include a default bearer communication, for example.

After the data packets have been processed by the PSP 210, the data packets are transmitted from the RAN 200 to an access terminal (AT) 260 in the BE communication link over an air interface. Examples of an AT include a mobile station, a mobile unit, a wireless phone, wireless equipped PDA or computer, etc. The AT 260 may be synonymous with a user equipment or any other similar device. Furthermore, the RAN 200 including the PSP 210 may be implemented in any type of wireless technologies including but not limited to GSM, CDMA, UMTS, LTE and WiMax, for example.

Figure 2B:
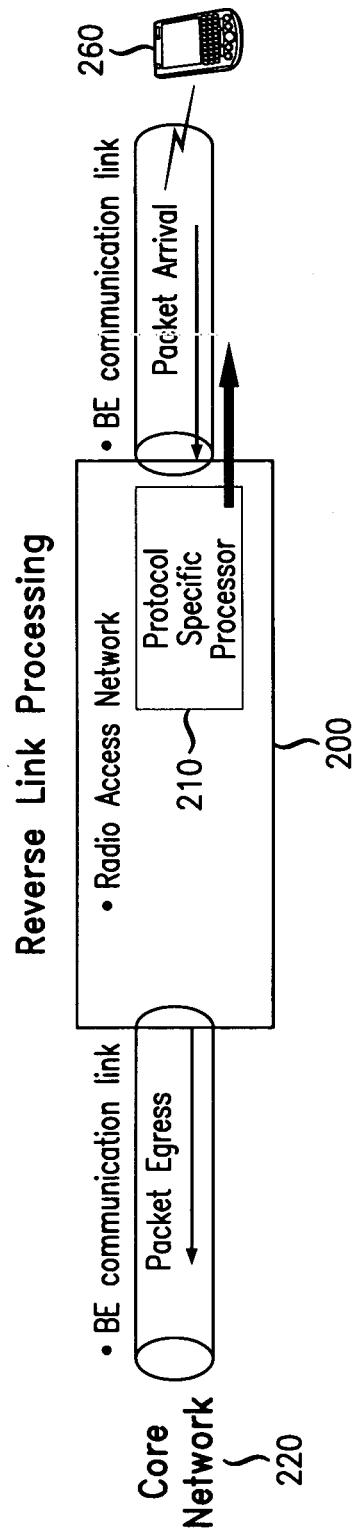
FIG. 2B illustrates a system for controlling parameters for applications serviced in the BE communication link on the reverse link according an embodiment of the present invention.

FIG. 2B illustrates a system for controlling parameters for applications serviced in the BE communication link on the reverse link according an embodiment of the present invention. For instance, FIG. 2B illustrates a Radio Access Network (RAN) 200, which receives a data packet from the AT 260 in the BE communication link. Similar to forward link processing, the RAN 200 includes a PSP 210 for processing data packets received from the AT 260. Unlike forward link processing, on the reverse link, the PSP 210 is also configured to feed back the parameters to the AT 260 so the AT 260 can be instructed to modify processing of reverse link packets. The details of how the PSP 200 processes the data packets in the BE communication link are described with reference to FIG. 3.

Figure 3:
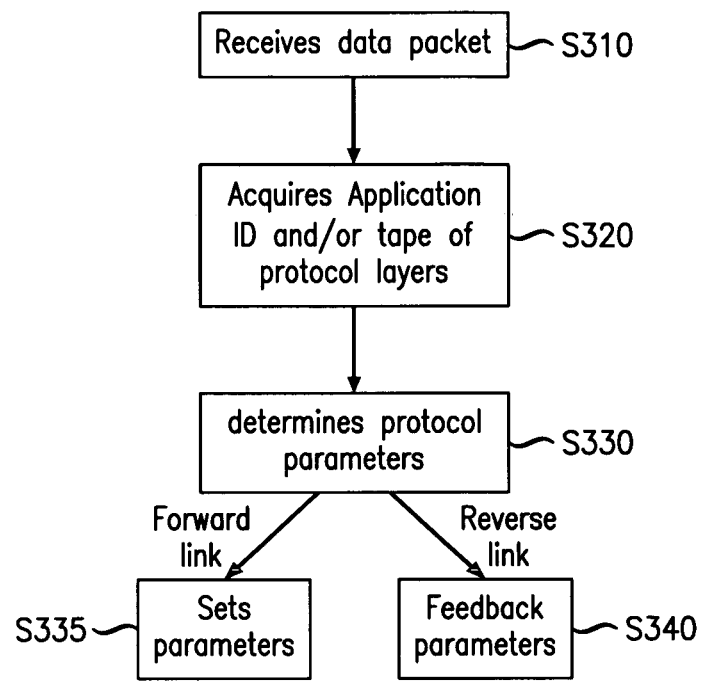
FIG. 3 illustrates a flow chart showing the functions of a protocol specific processor for reverse and forward link transmissions according to an embodiment of the present invention.

FIG. 3 illustrates a flow chart showing the functions of the PSP 210 for reverse and forward link transmissions according to an embodiment of the present invention. For instance, in step S310, the PSP 210 receives data packets in the BE communication link for processing from either the core network 220 (forward link) or the AT 260 (reverse link). In step S320, the PSP 210 acquires an (i) application identifier and/or (ii) type of protocol associated with at least one layer higher than an internet layer, for the data packet transmitted on the forward or reverse link.

For example, the application identifier is an identifier that identifies the type of application that is associated with the data packet. For instance, if the data packet is associated with Skype™ (e.g., a VoIP application), an identifier is transmitted with the data packet that uniquely identifies the Skype™ application so as to distinguish it from other types of applications.

The layers for the internet protocol suite include four protocol layers: application layer, transport layer, internet layer and network interface layer, for example. A type of protocol for the application layer may be DNS, TFTP, TLS/SSL, FTP, Gopher, HTTP, IMAP, IRC, NNTP, POP3, SIP, POP, and SSH, among others, for example. A type of protocol for the transport layer may be TCP, UDP, DCCP, SCTP, IL and RUDP, among others, for example. A type of protocol for the internet layer may be OSPF, for example. A type of protocol for the network interface layer may be ARP, RARP, OSPF and NDP, among others, for example. The application and transport layers may be considered higher level layers, while the internet and network interface layers may be considered lower level layers. In the OSI model, the transport layer, session presentation layer, and application layer are considered higher than the internet layer.

In one embodiment, the PSP 210 may acquire type(s) of protocol(s) associated with one, two, or more than two layers higher than the internet layer. In addition, the PSP 210 may acquire types of protocols for all the higher level layers associated with the data packet to be transmitted. The various different types of protocols for the higher level protocol layers are further described with reference to FIG. 4.

The PSP 210 may acquire the application identifier and/or a type(s) of protocol(s) associated with higher level protocol layer(s) by examining the data packet. For instance, the PSP 210 examines the data packet by removing lower layer headers and examining the contents, or by any one of a variety of well-known techniques used for Deep Packet Inspection (DPI). In addition, the PSP 210 may acquire the application identifier and/or type(s) of protocol(s) associated with the higher level protocol layer(s) from an external source (not shown). The external source may be a router or other network element that performs deep packet inspection or header examination to determine properties associated with a packet. For instance, the external source may determine the application identifier and/or type(s) of protocol(s) associated with the higher level protocol layer(s) and communicates them to the PSP 210.

After the PSP 210 receives the application identifier and/or type(s) of protocol(s) for the at least one higher level protocol layer, in step s330, the PSP 210 determines parameters according to the application identifier and/or the type(s) of protocol(s) associated with the at least one higher level protocol layer.

Figure 4:
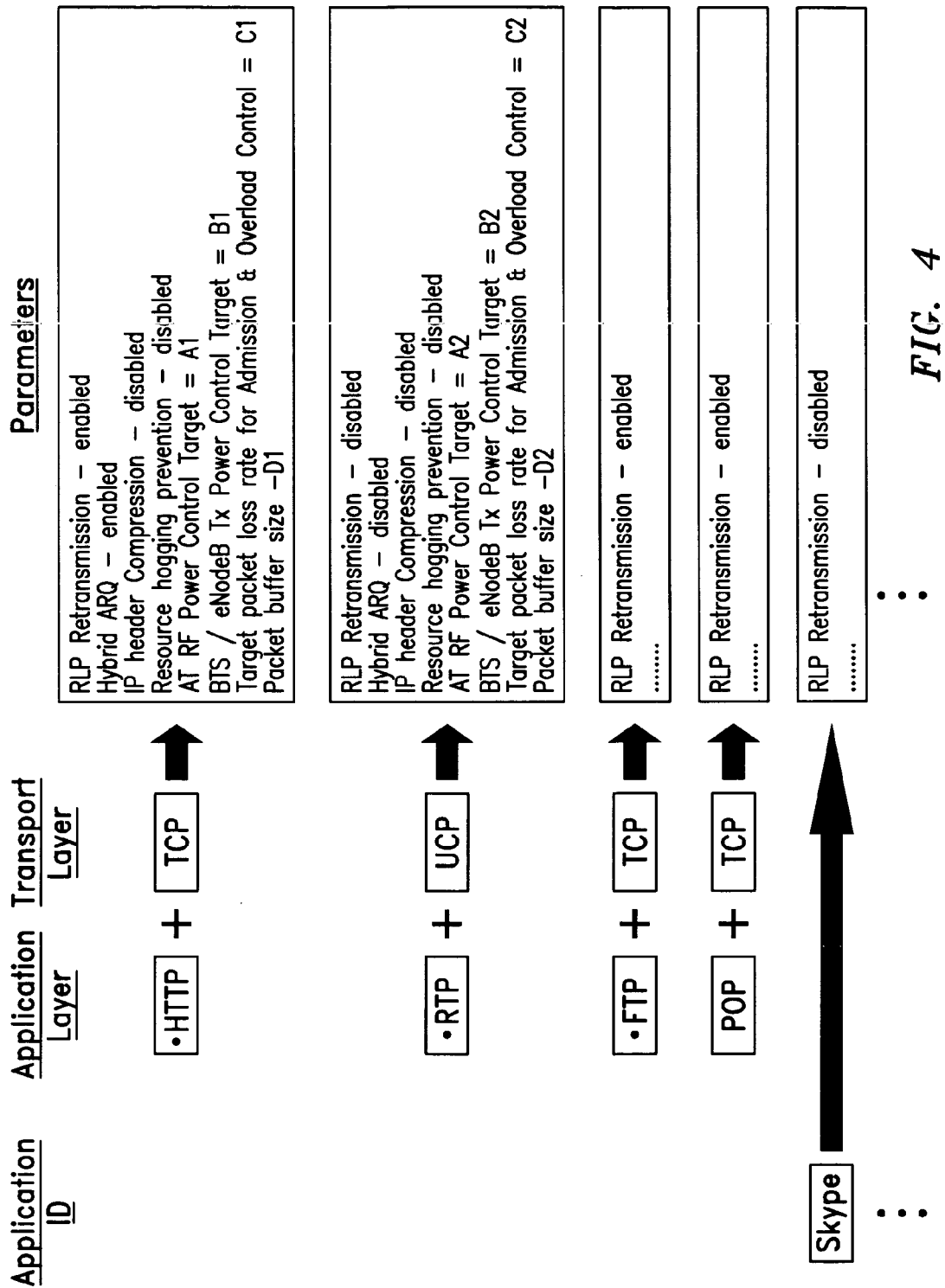
FIG. 4 illustrates parameters for the data packet based on the application identifier and/or type of protocol according to an embodiment of the present invention.

FIG. 4 illustrates parameters for the data packet based on the application identifier and/or type(s) of protocol(s) associated with the higher level protocol layer according to an embodiment of the present invention. For instance, FIG. 4 illustrates how a combination of application and transport layer parameters, or identification of a specific application may be used to select a set of parameters that are most appropriate for the higher layers. These parameters control the functioning of the radio link layer. For instance, the parameters may be any type of QoS parameters associated with the acquired application identifier and/or type(s) of protocol(s) for the higher level layer(s).

According to one embodiment of the present invention, if the type of protocol associated with the application layer is determined as HTTP and the type of protocol associated with the transport layer is determined as TCP, parameters may be determined accordingly. For instance, in this particular example, when the type of protocol associated with the application layer is HTTP and the type of protocol associated with the transport layer is TCP for the data packet to be transmitted, the parameters for transmitting the data packet are determined as follows: the RLP retransmission is enabled, the hybrid ARQ is enabled, the IP header compression is disabled, the resource hogging prevention is disabled, and the AT RF power control target, the BTS/eNode Tx Power Control Target, the target packet loss rate for Admission and Overload Control, and Packet buffer size are set according to fixed values (e.g., A1, B1, C1 and D1, respectively). The above-identified parameters for the HTTP type of application layer and the TCP type of transport layer are used for explanatory purposes only, where other types of parameters may be used for the HTTP type of application layer and the TCP type of transport layer. In addition, example embodiments of the present invention are not limited to only two protocol layers. For instance, the type(s) of protocol(s) may be determined according to one protocol layer higher than an internet layer or more than two higher level layers.

Referring to FIG. 4, if the type of protocol associated with the application layer is identified as RTP and the type of protocol associated with the transport layer is identified as UDP for the data packet to be transmitted, another set of QoS parameters are set. For instance, the QoS parameters may include the following: the RLP retransmission is disabled, the hybrid ARQ is disabled, the IP header compression is disabled, the resource hogging prevention is disabled, the AT RF power control target, the BTS/eNode Tx Power Control Target, the target packet loss rate for Admission and Overload Control, and Packet buffer size are set according to fixed values (e.g., A2, B2, C2 and D2, respectively).

In addition, if the type of protocol associated with the application layer is identified as FTP and the type of protocol associated with the transport layer is identified as TCP for the data packet to be transmitted, the RLP retransmission is enabled. If the type of protocol associated with the application layer is identified as POP and the type of protocol associated with the transport layer is identified as TCP for the data packet to be transmitted, the RLP retransmission is enabled. Example embodiments of the present invention encompass all combinations of various types of protocol for higher level layers, as well as their corresponding parameters. The corresponding parameters are not only limited to the above-recited parameters for the identified application and transport layers, where other parameters may be used for the identified application and transport layers.

Furthermore, the application identifier may be used to determine a particular set of parameters. Referring to FIG. 4, in this particular example, if the application identifier indicates that the application associated with the data packet is Skype™, a set of parameters that are optimal for the Skype™ application are determined. For instance, the RLP retransmission is disabled. Although this example illustrates that the RLP retransmission is disabled, other types of parameters may be set as well. Furthermore, example embodiments also encompass all types of applications in addition to the Skype™ type application.

Referring back to FIG. 3, in step S335, the PSP 210 sets the determined parameters for transmission of the data packets on the forward link communication channel. In contrast, in step S340, the determined parameters are feed back to the AT 260 for transmission of the data packets on the reverse link, which the AT 260 sets the parameters determined by the PSP 210.

Example embodiments provide a mechanism to optimize RAN functions for applications and protocols that have not been designated to receive QoS treatment in the RAN.

Example embodiments of the present invention being thus described, it will be obvious that the same may be varied in many ways. Such variations are not to be regarded as a departure from the spirit and scope of the exemplary embodiments of the invention, and all such modifications as would be obvious to one skilled in the art are intended to be included within the scope of the invention.

What is claimed is:

1. A system for controlling parameters for applications serviced in a best effort (BE) communication link, the system comprising:
a protocol specific processor connected in between a core network and a mobile device, the protocol specific processor configured to
receive a data packet via the BE communication link,
perform analysis of the packet to acquire at least one of (i) an application identifier and (ii) a type of protocol associated with at least one layer, of an internet protocol suite, higher than an internet layer for the packet, and
determine parameters, the parameters being associated with the type of protocol associated with the at least one layer, for the packet according to the acquired at least one of (i) an application identifier and (ii) a the type of protocol associated with the at least one layer such that the packet is identified to receive quality of service (QoS) treatment in a Radio Access Network,
wherein the protocol specific processor is configured to perform the analysis after the data packet leaves the core network if the data packet is a forward link packet sent from the core network towards the mobile on the BE communication link, and the protocol specific processor is configured to perform the analysis before the data packet arrives at the core network if the data packet is a reverse link packet sent from the mobile towards the core network on the BE communication link.

2. The system of claim 1, wherein the determined parameters are QoS parameters associated with the acquired at least one of (i) the application identifier and (ii) the type of protocol associated with the at least one layer.

3. The system of claim 1, wherein the at least one layer includes an application layer and transport layer.

4. The system of claim 1, wherein the at least one layer includes all layers higher than the internet layer.

5. The system of claim 1, wherein the protocol specific processor is configured to examine the packet to determine the at least one of (i) application identifier and (ii) type of protocol associated with the at least one layer.

6. The system of claim 1, wherein the protocol specific processor determines the at least one of (i) the application identifier and (ii) the type of protocol associated with the at least one layer by receiving the at least one of (i) the application identifier and (ii) the type of protocol associated with the at least one layer from an external source.

7. The system of claim 1, wherein the protocol specific processor is configured to determine the parameters for the packet in-real time.

8. The system of claim 1, wherein the protocol specific processor is configured to set the determined parameters for forward link communications.

9. The system of claim 1, wherein the protocol specific processor is configured to feedback the determined parameters to an access terminal for reverse link communications.

10. The system of claim 1, wherein the BE communication link is a communication link that services applications that have not been specifically identified as requiring the QoS treatment.

11. The system of claim 1, wherein the application identifier is an identifier that identifies a type of application that is associated with the data packet.

12. A method for controlling parameters for applications serviced in a best effort (BE) communication link, the method comprising:
receiving a data packet via the BE communication link;
acquiring, by a protocol specific processor connected between a core network and a mobile device, at least one of (i) an application identifier and (ii) a type of protocol associated with at least one layer, of an internet protocol suite, higher than an internet layer for the packet; and
determining, by the protocol specific processor, parameters, the parameters being associated with the type of protocol associated with the at least one layer, for the packet according to the acquired at least one of (i) an application identifier and (ii) a type of protocol associated with the at least one layer such that the packet is indentified to receive quality of service (QoS) treatment in a Radio Access Network,
wherein the acquiring occurs after the data packet leaves the core network if the data packet is a forward link packet sent from the core network towards the mobile on the BE communication link, and before the data packet arrives at the core network if the data packet is a reverse link packet sent from the mobile towards the core network on the BE communication link.

13. The method of claim 12, wherein the determined parameters are QoS parameters associated with the acquired at least one of (i) the application identifier and (ii) the type of protocol associated with the at least one layer.

14. The method of claim 12, wherein the at least one layer includes an application layer and transport layer.

15. The method of claim 12, wherein the at least one layer includes all layers higher than the internet layer.

16. The method of claim 12, wherein the acquiring step includes:
examining the packet to determine the at least one of (i) the application identifier and (ii) the type of protocol associated with the at least one layer.

17. The method of claim 12, wherein the acquiring step includes:
determining the at least one of (i) the application identifier and (ii) the type of protocol associated with the at least one layer by receiving the at least one of (i) the application identifier and (ii) the type of protocol associated with the at least one layer from an external source.

18. The method of claim 12, further comprising:
setting the determined parameters for forward link communications.

19. The method of claim 12, further comprising:
feeding back the determined parameters to an access terminal for reverse link communications.

20. The method of claim 12, wherein the BE communication link is a communication link that services applications that have not been specifically identified a requiring QoS treatment.

* * * * *